United States Patent [19]

Kashigi et al.

[11] Patent Number: 4,774,507
[45] Date of Patent: Sep. 27, 1988

[54] SPECIAL VIDEO EFFECT SYSTEM

[75] Inventors: Kazuo Kashigi; Keiichi Hirayama, both of Tokyo, Japan

[73] Assignee: NEC Corporation, Japan

[21] Appl. No.: 731,549

[22] Filed: May 7, 1985

[30] Foreign Application Priority Data

May 7, 1984 [JP] Japan .................................. 59-90664

[51] Int. Cl.[4] .............................................. H04N 7/04
[52] U.S. Cl. ..................... 340/723; 358/22; 358/183
[58] Field of Search ............... 340/723, 744, 727, 728, 340/731, 732; 358/22, 181, 182, 183, 185

[56] References Cited

U.S. PATENT DOCUMENTS 4,178,613 12/1979 Takahashi et al. ............... 358/22 X
4,196,449 4/1980 Tame et al. ........................ 358/22 X
4,301,475 11/1981 McCoy ........................... 358/183 X
4,581,640 4/1986 Cole ..................................... 358/141

Primary Examiner—Gerald L. Brigance
Attorney, Agent, or Firm—Ostrolenk, Faber, Gerb & Soffen

[57] ABSTRACT

A circuit for processing television signals to produce special effects includes a special effects circuit and a key signal generating circuit. Instead of generating the key signal separately and tailoring it for the desired special effects by using complicated circuits, the key signal is superimposed onto a video signal to produce a composite video signal which signal is processed to conform to the desired special effects. After the processing, the key signal is separated from the composite video signal to be used as it is intended. Thus, complicated and dedicated circuits solely for use for processing the key signal are eliminated.

13 Claims, 2 Drawing Sheets

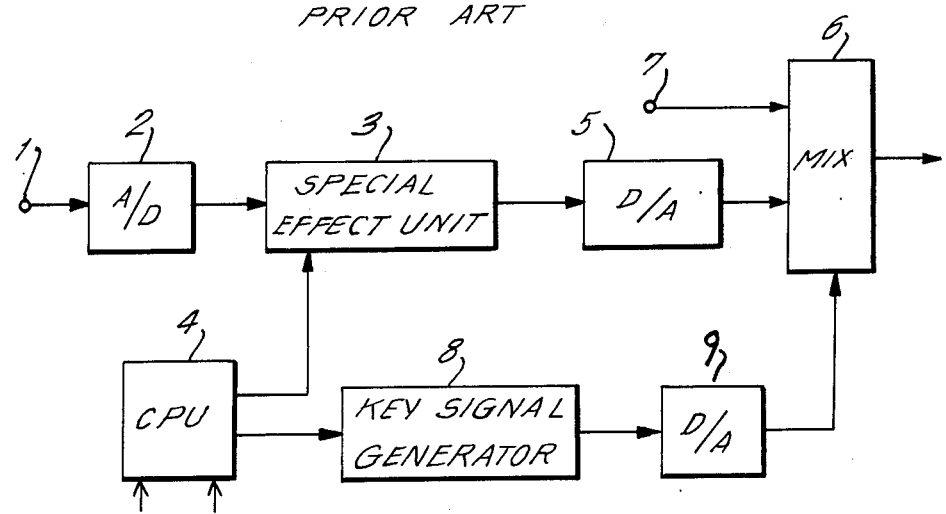
FIG. 1 - PRIOR ART
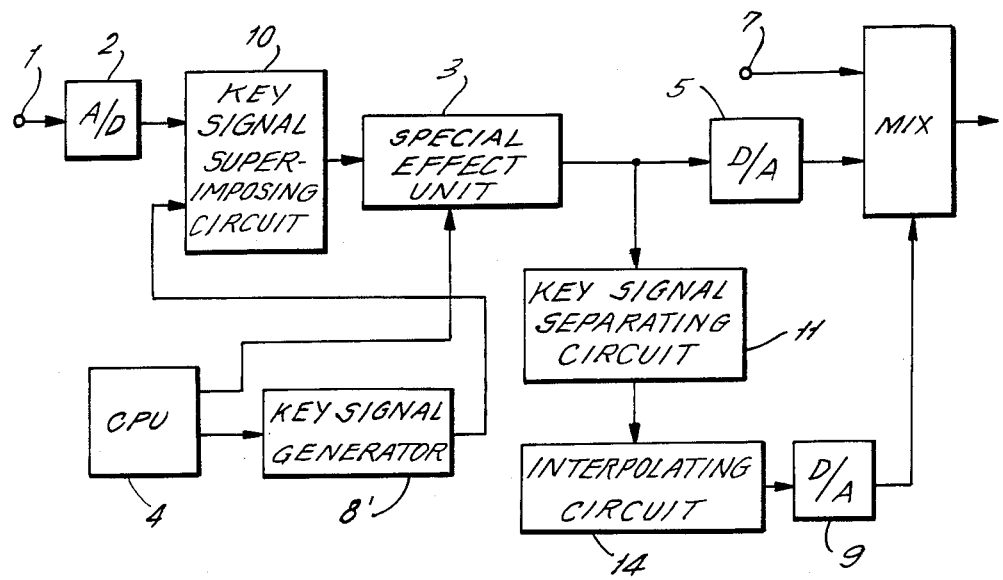
FIG. 2

SPECIAL VIDEO EFFECT SYSTEM

BACKGROUND OF THE INVENTION

The present invention relates to a video signal processing system and, more particularly, to a special video effect system for combining video signals while compression, enlargement or rotation processing is being applied thereto.

In a special video effect system for television broadcasting, a plurality of video signals are frequently combined on a TV picture screen by using a key signal. Further, by using a digital process, various special effects such as the compression, enlargement and rotation of a picture are frequently performed. Therefore, when the video signals are to be combined, such digital processes may be used. In this case, it is necessary to produce a special key signal for the combination of video signals in accordance with a desired special effect. A prior art special effect system includes a digital special effect unit for special video processing, a key signal generating unit and a a micro-computer (CPU) for controlling the two units. The CPU provides a control signal to a digital special effect unit and a key signal generating unit so that the desired special effect can be produced. In the digital special effect unit, special video processing corresponding to the desired special effect is performed in response to the control signal. In the key signal generating unit, a key signal suitable to the desired special effect is also generated in response to the control signal. In the key signal generating unit, a large-scale circuit configuration is not required when the desired special effect is relatively simple, for example, a wiping effect in the horizontal and/or vertical direction. However, when the desired special effect is complicated as, for example, when accompanied by a rotation process and a tilting process, the key signal generating unit according to the prior art is quite complicated and as complicated as the special effect unit.

SUMMARY OF THE INVENTION

It is, therefore, an object of the present invention to provide an uncomplicated special video effect system for a key signal generating unit which is operative even when a complicated video process is produced by a digital special effect unit to produce complicated special effects.

According to the present invention, there is provided a special video effect system which comprises: a special effect unit for processing a video signal; a key signal generating unit for generating a key signal; a key signal superimposing circuit for superimposing the key signal delivered from the key signal generating unit over a video signal to be transmitted to the special effect unit; a key signal separating circuit for separating the key signal from a processed video signal delivered from the special effect unit; and a mixing circuit responsive to the separated key signal delivered from the key signal separating circuit for mixing the video signal delivered from the special effect unit and another video signal.

BRIEF DESCRIPTION OF THE DRAWINGS

FIG. 1 shows a block diagram of a video signal special effect system according to the prior art;

FIG. 2 shows a block diagram of one embodiment of the present invention;

DESCRIPTION OF THE PRIOR ART

Figure 3A:
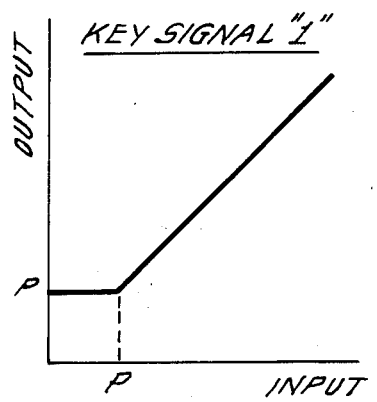
FIGS. 3(a) and (b) are graphs which show input/output characteristics of a key signal superimposing circuit.

In order to facilitate understanding of the present invention, a video signal special effects system according to the prior art will be described first with reference to FIG. 1. In this Figure, a video signal from an input terminal 1 is converted into a digital signal by a A/D converter. From the A/D converter the signal is sent to a special effect unit 3, in which the video signal is enlarged, compressed or rotated through digital processing to obtain a desired special effect.

For this processing, a control signal is sent from a CPU 4 to the special effect unit 3. A digital processed video signal from the special effect unit 3 is converted into an analog signal by a D/A converter 5 and is sent to a mixing circuit 6. In the mixing circuit 6, another video signal from a terminal 7 and the video signal from the D/A converter 5 are composed or combined in response to the key signal.

On the other hand, in response to the control signal delivered from the CPU 4, a key signal generating circuit 8 produces the aforementioned key signal in digital form according to the desired special effect. The digital key signal may be binary in case the video composition effect is sharp or is a multi-value signal of four bits where, for example, a soft video composition effect for blurring the boundary of the composed video signals is desired.

The digital key signal from the key signal generating circuit 8 is converted into the analog form by a D/A converter 9 and is sent to the mixing circuit 6. According to the prior art, to produce a key signal which is usable for various special effects including complicated effects, the key signal generating circuit 8 is required to have a large memory capacity to hold at least one television screen (one frame or one field) and an attendant complicated circuit configuration.

DESCRIPTION OF THE PREFERRED EMBODIMENT

An embodiment of the present invention, as illustrated in FIG. 2, differs from the prior art system of FIG. 1 in that there is disposed, ahead of the special effect unit 3, a key gating circuit 10 to which the key signal is supplied, and in that there is added, after the special effect unit 3, a key signal extracting circuit 11 in which the key signal is extracted from the video signal.

In combining a plurality of video signals to produce the special effect, most obtainable effects have a simple shape as compared to their original shape, although the final effect shape may be complex. To generate a key signal of a simple shape, a key signal generating circuit can be constructed of a combination of counter and comparator circuits without any use of a frame memory or a field memory.

In the present invention, a relatively simple key signal is gated with the video signal before special video processing on the video signal takes place. Consequently special video processing to for obtain a desired special effect is conducted on the video signal containing the key signal. The key signal in the video signal is therefore processed in accordance with the desired special effect. Later that key signal is extracted. This provides a remarkable benefit because it is unnecessary to independently provide a complicated process of producing a key signal which is suitable for various special effects.

Figure 3B:
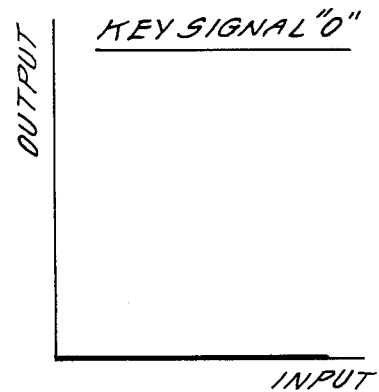

The input/output characteristics of the key gating circuit 10 are plotted in FIGS. 3(a) and (b). FIG. 3(a) corresponds to the case in which the key signal has a logical value "1" and FIG. 3(b) corresponds to the case of a logical value of "0". In FIG. 3(b), when the logical value is "0", no signal is sent to the special effect unit 3. And as shown in FIG. 3(a), when the logical value is "1", the key gating circuit 10 operates such that, the a video signal having a level higher than the pedestal level P is passed unchanged, and the video signal lower than the pedestal level P is modified to have a level which is equal to the pedestal level P.

Figure 4:
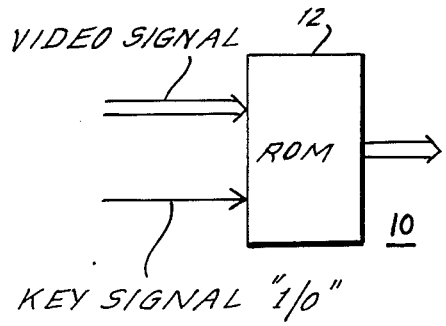
FIG. 4 shows one example of the key signal superimposing circuit.

This key gating circuit can be easily constructed by using a read only memory (ROM) 12, as shown in FIG. 4. In this figure, a plurality of bits representative of the input digital video signal from the A/D converter 2 and one bit representative of the key signal form a reading address of the ROM 12. The ROM 12 is preloaded with contents corresponding to the characteristics of FIGS. 3(a) and 3(b). Therefore, the ROM 12 delivers a modified, key-gated digital video signal in which the level of the incoming signal is modified in accordance with the input/output relationship depicted in FIGS. 3(a) and 3(b) in response to the key signal. In the special effect unit 3, during a period corresponding to a key signal of "0", an optional color can be inserted as a background color.

Figure 5:
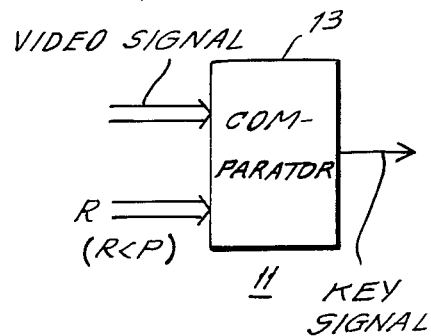
FIG. 5 is a diagram of a key signal separating circuit.

In FIG. 5, showing the structure of the key signal extracting circuit 11 is illustrated. A comparator 13 compares the video signal delivered from the special effect unit 3 with a reference value R which is lower than the pedestal level P. In response to the result of the comparison, the comparator 13 delivers a key signal having the logical value "1", when the level of video signal is higher than the reference value R, and, otherwise, the key signal is set to a logical value "0". As is apparent from the input/output characteristics of FIG. 3(a), the output of the key gating circuit 10 is set to a minimum value which is not below the pedestal level P, when the key signal is "1". Therefore, the key signal can be easily extracted out from the overall signal because the reference value R is set at a lower level than that pedestal level P. The key signal thus extracted has a binary level and, it is converted into a multi-value form having a suitable gradient by an interpolating circuit 14 (FIG. 2), if necessary.

As described in detail above, according to the present invention, the key signal is associated with the video signal and fed to the special effect unit, and, then, it is extracted again after special effects processing has taken place. As a result, shaping of a complicated key signal is carried out by the special effect unit so that the key signal generating remains an extremely circuit simple circuit.

What is claimed is:

1. A special video effect circuit comprising:
    receiving means for receiving a digital input video signal;
    producing means for producing a key signal having first and second logical levels, said key signal designating an area in said input video signal where a video effect is to be applied;
    modifying means for modifying the magnitude of said digital input video signal in response to said key signal to produce a modified video signal, said modified video signal having a signal level at least as large as a pedestal level of said input video signal when said key signal has said first logical level and having a signal level corresponding to a zero level when said key signal has said second logical level;
    special effect means for processing said modified video signal to produce a special video effect image and for generating a processed video signal representative of said special video effect image, said processed video signal being produced with a processed key signal contained therein; and
    extracting means for extracting said processed key signal from said processed video signal by comparing said processed video signal to a reference level which is lower than said pedestal level, said processed key signal having said first logical level when the magnitude of said processed video signal is greater than said reference level.

2. A special video effect circuit according to claim 1, wherein said modifying means includes:
    means responsive to said first logical level of said key signal for making the level of said modified video signal equal to the level of said input video signal when said input video signal has a level higher than said pedestal level and making the level of said modified video signal equal to said pedestal level when said input video signal has a level lower than said pedestal level.

3. A special video effect circuit according to claim 1, wherein said modifying means comprises a ROM having read address inputs which receive said input digital video signal and said key signal and said ROM having outputs which deliver said modified video signal, said ROM being programmed to provide the function of said modifying means.

4. A special video effect circuit comprising:
    control signal generating means for generating a control signal representative of a desired special effect;
    key signal generating means responsive to said control signal for generating a key signal which is effective for indicating an area in a digital input video signal to which said desired special effect is to be applied;
    key signal gating means for changing the magnitude of the input video signal in response to said key signal to produce a modified video signal therefrom, said modified video signal having a first level at least as large as a pedestal level when said key signal indicates that said desired special effect is to be applied and having a second level less than said first level when said key signal does not indicate that said desired special effect is to be applied;
    special effect processing means for processing said modified video signal to apply to said modified video signal said desired special effect in response to said control signal and to produce therefrom a special effect video signal;
    key signal extracting means for extracting a key signal component from said special effect video signal delivered from said special effect processing means and for providing a reproduced key signal by discriminating between said first and second levels contained in said special effect video signal; and
    combining means for combining said special effect video signal produced by said specific effect processing means and another video signal in response to said reproduced key signal.

5. A method for producing a processed key signal for an associated special video effect, said method comprising the steps of:
   modifying the magnitude of a digital input video signal in response to said key signal associated with said special video effect to produce a modified video signal, said modified video signal having a first level at least as large as a pedestal level when said key signal has a first logical state, and having a second level less than said first level when said key signal has a second logical state;
   subjecting said modified video signal to said associated special effect in a special effect circuit; and
   extracting a key signal which comprises said processed key signal from an output produced by said special effect circuit by discriminating between said first and second levels contained in said output.

6. A method as in claim 5, further comprising the step of generating a control signal representative of a desired special effect for controlling said special effect circuit.

7. A special video effect apparatus comprising:
   means for receiving an input digital video signal;
   means for generating a first key signal having first and second binary states;
   means coupled to said receiving means and to said key signal generating means for modifying said input digital video signal in response to said first key signal to produce a modified video signal, a signal level of said modified video signal being equal to a signal level of said input video signal when said input video signal has a level higher than a threshold level and when said first key signal has said first binary state, a signal level of said modified video signal being set to a predetermined fixed level when said input video signal has a level lower than said threshold level and when said first key signal has said first binary state, a signal level of said modified video signal being set to zero when said first key signal has said second binary state;
   means coupled to said modifying means for subjecting said modified video signal to a special video effect to generate a special effect video signal;
   means coupled to said subjecting means for producing a second key signal having first and second binary states from said special effect video signal by detecting a signal level of said special effect video signal; and
   means coupled to said subjecting means and to said second key signal producing means for combining said special effect video signal and another video signal in response to the binary state of said second key signal.

8. An apparatus as claimed in claim 7, wherein said modifying means includes memory means for storing therein contents corresponding to a function of said modifying means, said memory means receiving said input video signal and said first key signal as a reading address input and delivering said modified video signal.

9. An apparatus as claimed in claim 7, wherein said second key signal producing means includes a comparator for comparing said signal level of said special effect video signal with a level lower than said predetermined fixed level, said second key signal having said second binary state when said signal level is less than said level.

10. A special video effect circuit comprising:
    receiving means for receiving an input digital video signal having a varying signal level;
    key signal producing means for producing a key signal which defines a predetermined region in said input digital video signal where a second video signal is to be inserted;
    modifying means for modifying the level of said input digital video signal in response to said key signal to produce a modified video signal, said modified video signal having a fixed level lower than a pedestal level at said predetermined region;
    special effect means for processing said modified video signal to produce a special effect video signal; and
    means for producing a special effect key signal by detecting said fixed level contained in said special effect video signal.

11. The special video effect circuit of claim 10, wherein said key signal has first and second voltage levels associated therewith and wherein said input digital video signal has said pedestal level associated therewith, said modifying means being effective for generating said modified video signal such that:
    (a) said modified video signal has a level which is equal to said input video signal when the level of said input video signal is higher than said pedestal level and said modified video signal is equal to said pedestal level when the level of said input digital video signal is lower than said pedestal level, whenever said key signal is at its said first voltage level; and
    (b) said modified video signal has said fixed level which is substantially equal to zero whenever said key signal is in its second voltage level.

12. A special video effect circuit comprising:
    receiving means for receiving an input digital video signal;
    key signal producing means for producing a key signal having a waveform which is effective for defining a region in said input digital video signal where a second video signal is to be inserted;
    modifying means for modifying the level of said input digital video signal in response to said key signal to produce a modified video signal, said modified video signal having a fixed level lower than a pedestal level during said region;
    control signal generating means for generating a control signal which is effective for defining a special video effect which is to be imparted to a picture frame derived from said input digital video signal;
    special effect processing means for processing said modified video signal in accordance with said control signal to produce therefrom a special effect video signal;
    key signal extracting means for extracting a key signal component from said special effect video signal by detecting said fixed level contained in said special effect video signal to produce a special effect key signal; and
    combining means for combining said special effect video signal and another video signal based on said special effect key signal.

13. A method for producing a special effect key signal, said method comprising the steps of:
    receiving an input digital video signal;
    gating said input digital video signal in accordance with a key signal to produce a gated video signal, said key signal designating an area in a television image frame associated with said input digital video signal where another video signal is to be inserted, said gated video signal having a fixed level corresponding to a zero level at said area;

processing said gated video signal in a special effect circuit which is effective for defining a special video effect for said gated video signal to produce a special effect video signal; and extracting a key signal component from said special effect video signal to produce said special effect key signal by detecting said fixed level contained in said special effect video signal.

* * * * *